Dec. 28, 1965   M. F. GUIDA   3,225,472
SIMULATIVE DISPLAY DEVICES
Filed Aug. 22, 1962

Michael F. Guida
INVENTOR.

BY
Stevens, Lehrer & Stevens
Attorneys.

United States Patent Office 3,225,472
Patented Dec. 28, 1965

3,225,472
SIMULATIVE DISPLAY DEVICES
Michael F. Guida, 1247 N. Lockwood Ave.,
Chicago 51, Ill.
Filed Aug. 22, 1962, Ser. No. 218,752
1 Claim. (Cl. 40—106.41)

My invention relates to animated display devices, and more particularly to those which simulate an amusing sport or performance. The subject employed by the present device is the juggling of balls by tossing them from one hand to the other, this being a performance which is popular on the stage or in the circus, and engaged in by professional jugglers, clowns and trained animals.

The invention has for its main object to provide a display in which the action of the hands and tossing of the balls or other objects are simulated with a realistic effect.

A further object is to include an illustration in relation to the action of the hands, such as a picture of the juggler, clown or animal, whereby to simulate a living performance.

Another object is to incorporate the invention in an attractive stand for window, indoor or outdoor display, with room provided in the front of the stand for descriptive or advertising material.

An additional object is to incorporate a simple and inexpensive mechanism in the stand for producing the simulative effect mentioned.

A better understanding of the invention may be gained by reference to the accompanying drawing, in which FIG. 1 is a front elevation of the novel display device, partly in section;

Figure 1:
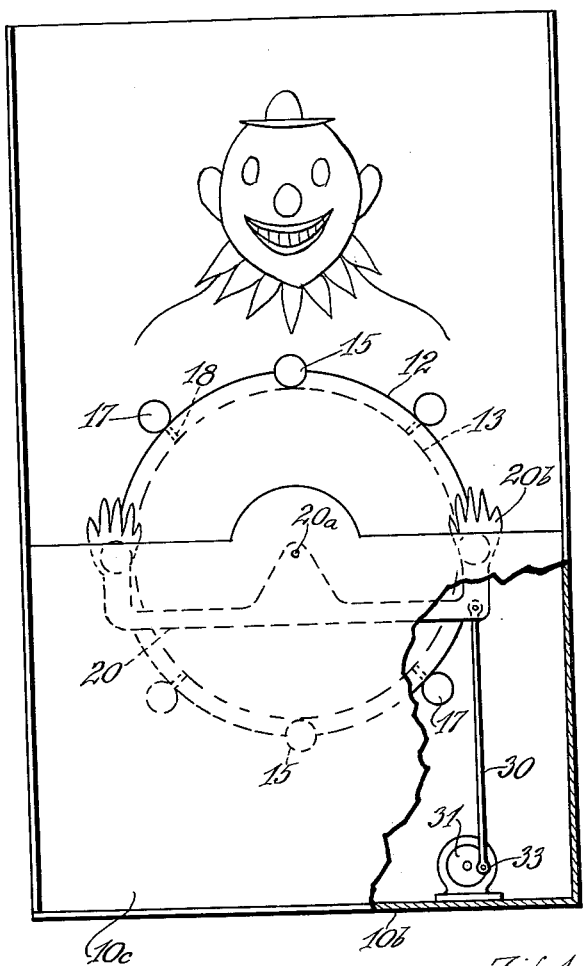

Referring specifically to the drawing, 10 denotes an upright stand of light material, such as pasteboard, containing the mechanism of the device, the stand having side wings 10a, a base 10b, a short front wall 10c and a full-height middle wall 10d.

The parts depicting the balls and their flight consist of a pair of large circular discs 12 and 13 inside the front wall 10c and spaced closely from each other. The disc 12 is in front of and larger than the disc 13; and such disc 12 carries a series of circular tabs 15 in the region of its periphery, the tabs being fully visible from the front and painted an attractive light color, such as yellow or pink.

A set of tabs 17 similar to the tabs 15 is applied to the smaller disc 13, but mounted on radial pins 18 spacing the tabs from the periphery of the disc. The discs 12 and 13 are centered on the same axis for rotation, and the radial position of the tabs 17 is mostly outside of the course of the tabs 15, so that when the discs turn the tabs will impress the viewer as traveling in similar paths.

The discs 12 and 13 are mounted to rotate in opposite directions. The tabs 15 and 17 then simulate the juggling balls, and will appear to be flying in crossing relation as if tossed from the side. The action will be intensified by having the discs and the walls 10c and 10d painted a solid dark color to form a contrasting background for the light-colored tabs 15 and 17.

Since the tossing of the balls is the origin of their flight, such performance is necessarily a part of the ball-juggling act; and the hands and their movements are conspicuous in this respect. Such movements are usually in rising and falling directions; and the present device includes an element depicting the hands and their movements. Thus, a bar 20 is pivoted at a central point behind the front wall 10c as indicated at 20a; and the ends of the bar occur along the side paths of the rotary tabs 15 and 17, such ends being turned up to terminate with simulated hands 20b. When the bar 20 receives a rocking motion during the rotary travel of the discs 12 and 13 in opposite directions, the impression will be given that the hands are tossing balls in crossing paths, in simulation of a familiar ball-juggling act. In this respect, the identity of the juggler completes the act, and the upper part of the middle wall 10d bears a picture of a clown—as shown in FIG. 1—or other human, animal or fanciful figure representing the juggler. Further animation may be had, if desired, by mounting the figure of the juggler on a board or card which is given an oscillating or other animated movement.

While various means may be employed to operate the discs 12 and 13 and the rocker bar 20 as described, a mechanism which is preferred and quite simple is illustrated. Thus, the disc 12 is carried by a horizontal shaft 12a journaled with one end in the front wall 10c and the other in a bearing arm 22 located in the rear compartment 10e of the stand; and the disc 13 is carried by a center sleeve 13a rotatable on the shaft 12a and journaled in the middle wall 10d and a bearing arm 23 companion to the bearing arm 22. The arms 22 and 23 form part of a frame for a motor 25 supported on a cross-bar 26 in the stand compartment 10e. A bevel gear drive 28 from the motor operates the shaft 12a and sleeve 13a in opposite directions. The rocker bar 20 is given oscillating motion by a connecting rod 30 leading from the side of a disc 31 driven by a motor 33. It may be observed that motors used for display devices are geared internally for slow speed, and may therefore be coupled directly to the parts operated, avoiding the complication and expense of outside gearings.

Figure 2:
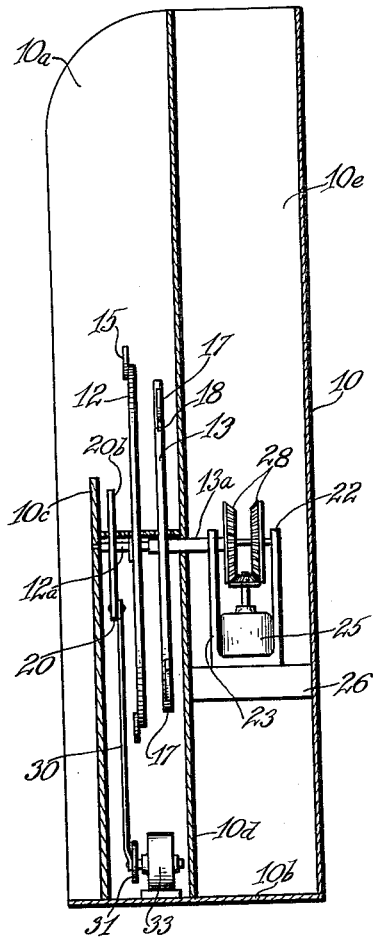
FIG. 2 is a view of the interior of the device, from the right-hand side of FIG. 1.
Figure 3:
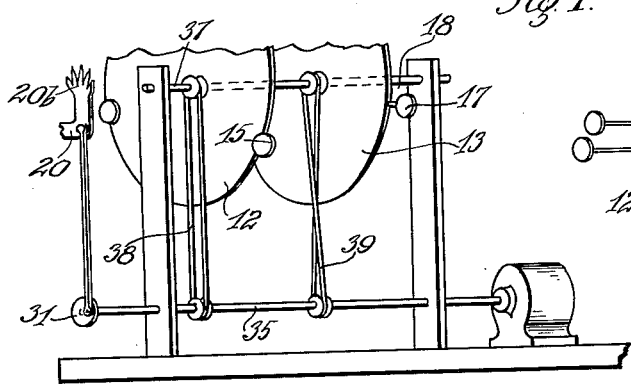
FIG. 3 is a perspective view of a modified drive.

While the drives for the discs and rocker bar are separate as shown in FIGS. 1 and 2, one drive employing gears, FIG. 3 shows that one motor shaft 35 may be employed for operating both the discs and the rocker bar. The discs are mounted freely on a jack-shaft 37 and operated in reverse directions by belt drives 38 and 39, while the disc 31 for the connecting rod 30 is carried by the motor shaft, as shown.

Figure 4:
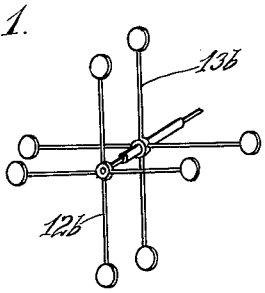
FIG. 4 is a perspective view of a modified carrier for the ball display.

FIG. 4 shows a modification of the supports for the tabs 15 and 17. The discs are replaced by spiders 12b and 13b composed of thin wires which carry the tabs. With the spiders colored like the background, the illusion will be that the tabs are traveling in space, lending realism to the performance.

It will now be apparent that the novel device creates a fascinating and realistic display of a performance usually given in theatres and by persons or trained animals. The display device is light and compact, and may be readily set up in a store window or in places where the public passes or gathers. Owing to the broad expanse of the front and middle walls, space thereon may be devoted to descriptive or advertising data to which the attention of those viewing the juggling performance may be desired.

While I have described the invention and its modifications along specific lines, various minor changes or refinements may be made therein without departing from the principle of the invention, and I reserve the right to employ all such changes and refinements as may fall within the scope and spirit of the appended claim.

I claim:

A simulative display device comprising a support, a pair of rotary members journaled on one axis in the same, a series of symbolic objects carried by each member in similar circular paths, and means for rotating the members in opposite directions to cause the objects in one series to revolve in crossing relation with those in the other series and make the objects appear as in flight, a wall in front of one member and rising to a substantially diametrical level, whereby to present the illusion that the objects rise from the sides and cross at intermediate points in their flight, hand symbols adjacent to the wall at said sides, and means to raise the hand symbols alternately and suggest that the objects are tossed toward each other in alternation by the hands.

References Cited by the Examiner

UNITED STATES PATENTS

| | | | |
|---|---|---|---|
| 1,284,116 | 11/1918 | Lee | 40—70 X |
| 1,897,918 | 2/1933 | Wagenhals | 40—52 |
| 2,956,369 | 10/1960 | Rolin | 40—49 |

FOREIGN PATENTS

| | | |
|---|---|---|
| 422,949 | 2/1911 | France. |
| 544,035 | 2/1932 | Germany. |

EUGENE R. CAPOZIO, *Primary Examiner.*

JEROME SCHNALL, *Examiner.*